July 26, 1949.　　　C. D. SHRADER　　　2,477,528
VARIABLE SPEED HAND TOOL
Filed Dec. 31, 1946
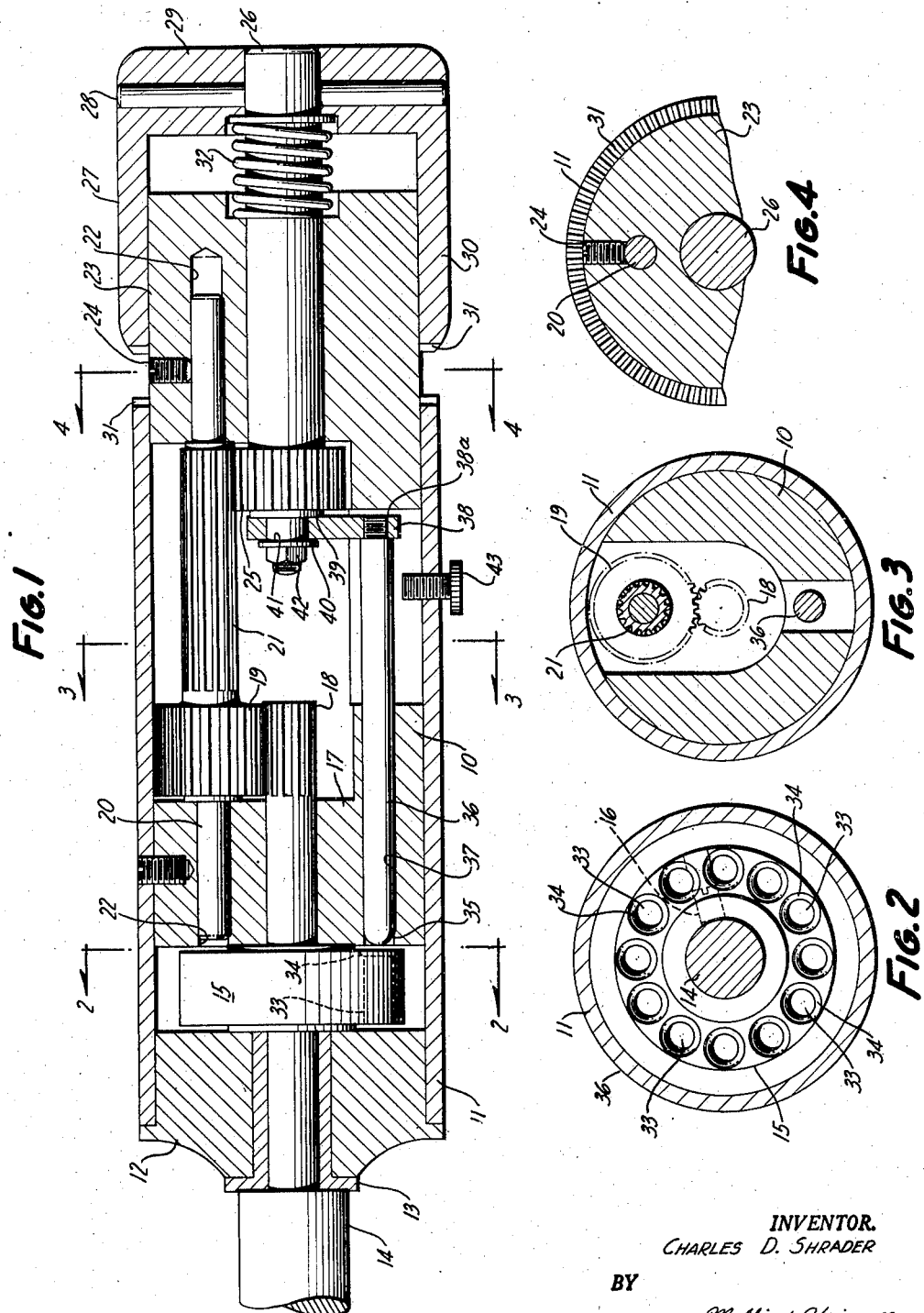
INVENTOR.
CHARLES D. SHRADER
BY
Mellin & Hanscom
ATTORNEYS Patented July 26, 1949

2,477,528

UNITED STATES PATENT OFFICE 2,477,528

VARIABLE-SPEED HAND TOOL

Charles D. Shrader, Alameda, Calif., assignor, by mesne assignments, to Richard Ronne, Sacramento, Calif.

Application December 31, 1946, Serial No. 719,495

7 Claims. (Cl. 74—789)

The present invention relates to hand tools for installing or removing threaded machine elements, such as screws or nuts, on or from cooperable threaded members.

In the installation of a machine screw or nut on a threaded member, two distinct operations are involved. First, the element must be rotated a plurality of revolutions to advance it toward a locked position, which requires comparatively little effort; and secondly, it is then turned (usually a partial revolution) to effect its tightening or locking, which requires a relatively high torque or turning effort. In the former case the ordinary screw driver or wrench requires much wrist motion and time in freely running the threaded element the full distance along the threads, while the act of tightening occurs as a result of comparatively slight angular motion of the screw driver or wrench. Removal of a threaded member from tightened position involves the same considerations mentioned above, although in reverse order.

It is, accordingly, an object of the present invention to provide a comparatively simple hand tool, which enables a screw, nut, or similar machine element to be tightened or loosened in the normal fashion, but which is capable of running the element freely the full required distance of the cooperable threads during its installation or removal in a rapid manner, thereby saving much time and wrist motion.

In its general aspects, the invention contemplates a hand tool capable of being grasped by the hand of the operator in much the same manner as a screw driver, for the purpose of rotating the tool shank at a one to one transmission ratio whenever desired, as during the tightening or loosening of the threaded element on a mating threaded member. However, while loose on the mating member, the element can be rotated at a much greater rate by use of the same hand tool, and with much less wrist motion than the conventional screw driver requires. The foregoing turning motions can be selected through changing the ratio of transmission of a variable speed transmission in the hand tool from one to one to an overdrive condition, which selection occurs simply as a result of the axial or longitudinal force imposed upon the end of the tool handle.

The invention is exemplified in the following description and illustrated by way of example in the accompanying drawings, in which:

Fig. 1 is a longitudinal section through a variable speed hand tool.

Figs. 2, 3 and 4 are cross-sections taken along the lines 2—2, 3—3 and 4—4, respectively, of Fig. 1.

As disclosed in the drawings, the tool includes an elongate main frame 10 having a forward or inward housing 11 capable of functioning as a handle. An end closure member 12 piloted within the housing 11 acts as a support for a central bearing 13, in which the driven shaft or shank 14 of the tool is rotatably mounted. This latter member projects outwardly from the end member and may have a suitable end for engaging a threaded element on which the tool is to operate. For example, it may have a bit on its end (not shown) for reception within the slot of a screw head, or an appropriate socket head (not shown) for containing a nut.

The tool shank 14 extends inwardly of the end member 12 and has a clutch collar 15 secured to it intermediate its length by means of a suitable screw 16 or the like. The inner portion of the shank 14 is rotatably mounted in a frame partition 17, and has a gear 18, integral with or secured on its innermost end, meshing with a pinion 19 rotatably mounted on a countershaft 20 disposed within the pinion 19 and also within a gear 21 integral with the latter member. The countershaft 20 is received within spaced bores 22 in the forward and rear frame partitions 17, 23, being held in place by a set screw 24. The countershaft gear 21 engages a driving pinion 25 fixed to a drive shaft 26 rotatably mounted in the rear frame partition 23 and extending completely therethrough, where a rotatable housing or outer handle member 27 is affixed to it by a transverse pin 28 extending through the head 29 of the handle and the drive shaft 26.

The rotatable housing 27 has a skirt 30 extending over the periphery of the frame partition 23, occupying a position adjacent the end of the inner handle member 11. Serrations or clutch teeth 31 may be formed on the opposed ends or faces of the handle members 11, 27 to lock them together upon longitudinal movement of the outer handle member 27 toward the inner handle member 11 against the force exerted by a helical spring 32 encircling the outer end of the drive shaft 26 and bearing against the end of the frame 23 and the head 29 of the rotatable handle. This spring normally biases the rotatable housing 27 away from the outer housing 11 and maintains the clutch teeth 31 out of engagement.

The clutch collar 15 has a plurality of circularly arranged sockets 33, whose entrance ends 34 are chamfered or tapered to guide the rounded forward end 35 of a clutch pin 36 into one of the sockets substantially aligned therewith. This pin 36 is mounted within a bore 37 extending through the frame 10, being movable longitudinally into and out of engagement with any one of the sockets 33, for the purpose of locking the driven shaft or tool shank 14 and its clutch collar 15 to the frame 10 of the hand tool. Longitudinal movement of the clutch pin 36 is obtained by longitudinally sliding the drive shaft 26 and rotatable handle member 27, such movement being transmitted to the clutch pin through a yoke 38 fitting within a peripheral groove on the inner end of the drive shaft 26 and threaded onto the end of the clutch pin 36. The groove may be formed in any suitable manner, as by a shoulder 39 on the shaft and a spaced washer 40 held against a second shaft shoulder 41 by a nut 42 threaded on the shaft end.

The rotatable handle 27 may transmit its rotation to the tool shank or driven shaft 14 through the gearing disclosed when the clutch pin 36 is positioned out of the socket holes 33. Since the driving pinion 25 has a greater pitch diameter than the driven countershaft gear 21, and since the driving countershaft gear 19 has a greater pitch diameter than the tool shank gear 18, the transmission ratio between the driving shaft 26 and the driven shaft 14 is less than one. As disclosed in the drawings, this ratio is about one and between three and four; that is, one revolution of the drive shaft 26 produces three to four revolutions of the tool shank 14.

Normally, the spring 32 maintains the rotatable handle 27 out of clutching engagement with the inner handle 11 and the clutch pin 36 disengaged from the clutch collar 15, allowing the inner handle 11 to be held in one hand and the outer handle 27 to be rotated and its motion transmitted through the gear train 25, 21, 19, 18 to the tool shank 14, rotating the latter at an increased speed with respect to the rotations of the outer handle. This rotation takes place when the tool shank 14 is engaged with a free running screw or nut, in order to spin it within or on a cooperable threaded member toward its tight position thereon. When the screw or nut has reached its tightened position, a comparatively great resistance to turning will be noted on the rotatable handle 27, whereupon it is natural for the operator to depress it by hand against the action of the spring 32, shifting the clutch pin 36 into a collar socket 33 and locking the driven shaft 14 to the frame 10, which action effectively locks the entire transmission against rotation within the frame. This locking action is assisted by engagement between the clutch teeth 31 on the rotatable handle 27 and inner handle 11. Thereafter, turning effort imposed on the rotatable handle 27 is transmitted at a one to one ratio to the driven shaft 14, enabling a greater torque to be imposed on the screw or nut in effecting its tightening, in the same manner as a conventional screw driver would effect tightening of a screw.

Similarly, if it is desired to loosen a screw or nut and remove it from its position on a cooperable threaded member, an inward force is exerted on the rotatable handle 27 to lock the transmission against rotation, and also lock the rotatable handle to the inner handle 11, whereupon a counterclockwise turning effort may be imposed on the outer handle 27 to loosen the screw or nut. As soon as loosening has occurred, the axial inward effort on the rotatable handle may be removed, the coil spring 32 then shifting the drive shaft 26 rearwardly to disengage the clutch pin 36 from the clutch collar 15 and the handle serrations 31 from one another, allowing the inner handle 11 to be grasped, as by the left hand, and the rotatable handle 27 turned freely by the right hand, which effects unthreading of the screw or nut at a rapid rate from its cooperable threaded member. It is obvious that the general actions of running a screw or nut to or from tightened position are essentially the same, except for different directions of rotation.

The transmission disclosed produces the same direction of rotation on the tool shank 14 as is imparted to the rotatable handle 27 and drive shaft 26. If desired, in order to facilitate rotation of the drive shaft 26 and to permit a greater torque to be imposed on the tool shank, the external diameter of the rotatable handle 27 may be made greater than the external diameter of the inner handle 11.

In the event it is desired to hold the two handle sections 11, 27 clutched together and the clutch pin 36 engaged within a socket 33 on the clutch collar 15, regardless of the axial force imposed on the rotatable handle 27, a suitable latch may be provided in the inner handle 11 adapted to slide into position adjacent the yoke 38 when the latter is disposed inwardly toward the collar 15. As disclosed, this latch may be constituted by a screw 43 threaded into the inner handle 11 and adapted to be moved inwardly to engage the outer face 38a of the yoke and prevent retraction of the clutch pin 36 from the socket 33 and disengagement between the teeth 31 of the handle sections 11, 27 under the influence of the spring 32 upon release of the endwise inward pressure on the rotatable handle 27. Thereafter, the tool functions in the same manner as a conventional screw driver.

It is, accordingly, apparent that a comparatively simple hand tool has been provided for rapidly rotating free running screws, nuts and similar elements to and from locked positions on cooperable threaded members. The transmission provides an overdrive requiring much less wrist motion and turning motion in running the screw or nut into and out of position; while manipulation of the tool in the same fashion as a conventional screw driver, to tighten or loosen the screw or nut, which action is naturally accompanied by the imposition of a longitudinal inward force on the outer handle 27, automatically locks the transmission and effects a one to one drive between the rotatable handle and the driven shaft or tool shank 14, enabling a greater torque to be imposed on the screw or nut in effecting its tightening or loosening. In the event that it is desired to employ the tool in the same conventional manner as a screw driver, the latch screw 43 is threaded inwardly, upon depression of the rotatable handle 27 against the force of the spring 32, to engage the yoke 38 and hold all of the clutch parts in clutching engagement.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A tool comprising supporting means providing an inner handle member, an outer handle member rotatable with respect to said supporting means, a tool shank rotatably mounted in said supporting means, a transmission between said rotatable handle member and shank for rotating said shank at a faster speed than said rotatable handle member and in the same direction, and clutch means on said handle members engageable upon longitudinal movement of said rotatable handle member for coupling said handle members together.

2. A tool comprising supporting means providing an inner handle member, an outer handle member rotatable with respect to said supporting means, a tool shank rotatably mounted in said supporting means, a transmission between said rotatable handle member and shank for rotating said shank at a faster speed than said rotatable handle member and in the same direction, clutch means operable by longitudinal movement of said rotatable handle member for locking said tool shank to said supporting member, and clutch means on said handle members engageable upon longitudinal movement of said rotatable handle member for coupling said handle members together.

3. A tool comprising supporting means providing an inner handle member, driving and driven shafts rotatable in said supporting means, an outer handle member secured to said driving shaft, a driving gear on said driving shaft, a driven gear on said driven shaft, a countershaft having a first gear meshing with said driving gear and a second gear meshing with said driven gear, a clutch collar secured to said driven shaft, and clutch means operable upon longitudinal movement of said driving shaft for coupling said collar to said supporting means.

4. A tool comprising supporting means providing an inner handle member, driving and driven shafts rotatable in said supporting means, an outer handle member secured to said driving shaft, a driving gear on said driving shaft, a driven gear on said driven shaft, a countershaft having a first gear meshing with said driving gear and a second gear meshing with said driven gear, a clutch collar secured to said driven shaft, clutch means operable upon inward longitudinal movement of said outer handle member and driving shaft for coupling said collar to said supporting means, and spring means for urging said outer handle member and driving shaft longitudinally outward to shift said clutch means and uncouple said collar from said supporting means.

5. A tool comprising supporting means providing an inner handle member, driving and driven shafts rotatable in said supporting means, an outer handle member secured to said driving shaft, a driving gear on said driving shaft, a driven gear on said driven shaft, a countershaft having a first gear meshing with said driving gear and a second gear meshing with said driven gear, a clutch collar secured to said driven shaft, a clutch member slidable in said supporting means and operable upon inward longitudinal movement of said outer handle member and drive shaft for coupling said collar to said supporting means, said inner and outer handle members having opposed clutch elements engageable upon such inward movement of said outer handle member, and spring means for urging said outer handle member and driving shaft longitudinally outward to disconnect said clutch member from said collar and to also disengage said handle member clutch elements from each other.

6. A tool comprising supporting means providing an inner handle member, driving and driven shafts rotatable in said supporting means, an outer handle member secured to said driving shaft, a driving gear on said driving shaft, a driven gear on said driven shaft, a countershaft having a first gear meshing with said driving gear and a second gear meshing with said driven gear, a clutch collar secured to said driven shaft, clutch means operable upon inward longitudinal movement of said outer handle member and driving shaft for coupling said collar to said supporting means, spring means for urging said outer handle member and driving shaft longitudinally outward to shift said clutch means and uncouple said collar from said supporting means, and means for holding said collar coupled to said supporting means against the force of said spring means.

7. A variable speed hand tool comprising an inner handle portion, an outer handle portion slidable axially of and rotatable with respect to the inner handle portion, resilient means urging the outer handle portion outwardly, a driving member fixed to the outer handle portion, a driven member rotatable in the inner handle portion, transmission means providing a driving connection between the driving and driven members to drive the latter at a high speed ratio, and clutch means operable by inward axial movement of the outer portion to couple the driving and driven members together for a one-to-one drive ratio.

CHARLES D. SHRADER.

REFERENCES CITED

The following references are of record in the file of this patent:

UNITED STATES PATENTS

| Number | Name | Date |
|---|---|---|
| 531,382 | McClay | Dec. 14, 1894 |
| 626,884 | Binsse | June 13, 1899 |
| 919,156 | Gilmore | Apr. 20, 1909 |
| 1,297,439 | Bugher | Mar. 18, 1919 |
| 1,438,227 | Eisenhard | Dec. 12, 1922 |
| 1,762,515 | Hiersch | June 10, 1930 |
| 1,815,032 | Boughton | July 21, 1931 |